(12) United States Patent
Nakanishi et al.

(10) Patent No.: US 7,760,289 B2
(45) Date of Patent: Jul. 20, 2010

(54) ELECTRO-OPTIC DEVICE, METHOD OF MANUFACTURING ELECTRO-OPTIC DEVICE AND ELECTRONIC EQUIPMENT

(75) Inventors: Daisuke Nakanishi, Matsumoto (JP); Yasunori Onishi, Azumino (JP)

(73) Assignee: Epson Imaging Devices Corporation (JP)

( * ) Notice: Subject to any disclaimer, the term of this patent is extended or adjusted under 35 U.S.C. 154(b) by 120 days.

(21) Appl. No.: 12/143,130

(22) Filed: Jun. 20, 2008

(65) Prior Publication Data
US 2009/0002930 A1 Jan. 1, 2009

(30) Foreign Application Priority Data

Jun. 27, 2007 (JP) ............................. 2007-168595
May 2, 2008 (JP) ............................. 2008-120213

(51) Int. Cl.
*G02F 1/1333* (2006.01)
(52) U.S. Cl. ........................................ 349/60; 349/58
(58) Field of Classification Search .................. 349/58, 349/60
See application file for complete search history.

(56) References Cited

U.S. PATENT DOCUMENTS

| | | | |
|---|---|---|---|
| 6,812,976 B2 | 11/2004 | Satonaka | |
| 6,956,637 B2 | 10/2005 | Satonaka | |
| 7,006,167 B2* | 2/2006 | Kashimoto | 349/58 |
| 2007/0115401 A1 | 5/2007 | Tsubokura et al. | |

FOREIGN PATENT DOCUMENTS

| | | |
|---|---|---|
| JP | 08-179283 | 7/1996 |
| JP | 10-301095 | 11/1998 |
| JP | 11-007000 | 1/1999 |
| JP | 2001-296816 | 10/2001 |
| JP | 2001-311938 | 11/2001 |
| JP | 2002-090710 | 3/2002 |
| JP | 2003-167235 | 6/2003 |
| JP | 2005-099616 | 4/2005 |
| JP | 2005-189597 | 7/2005 |
| JP | 2005-283826 | 10/2005 |
| JP | 2007-140246 | 6/2007 |

* cited by examiner

*Primary Examiner*—Richard H Kim
(74) *Attorney, Agent, or Firm*—Harness, Dickey & Pierce, P.L.C.

(57) ABSTRACT

An electro-optic device includes: an electro-optic panel; a panel supporting member for supporting the electro-optic panel from one of front side and back side of the electro-optic panel; a mounted member to be mounted to the panel supporting member from the other one of the front side and the back side. The electro-optic panel includes at least two outer edges opposing to each other in plan view; and the mounted member includes a pair of panel positioning guides for guiding the electro-optic panel by guiding the two outer edges respectively.

8 Claims, 7 Drawing Sheets

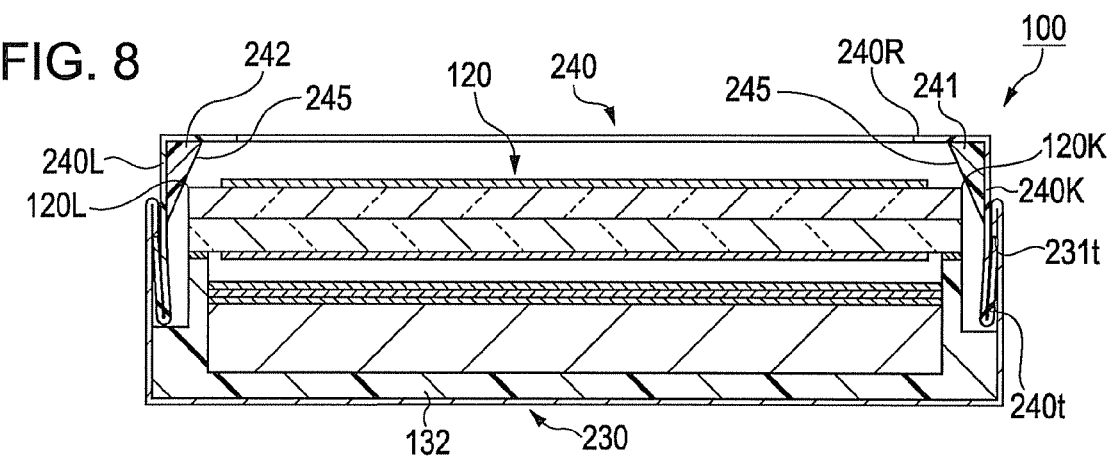
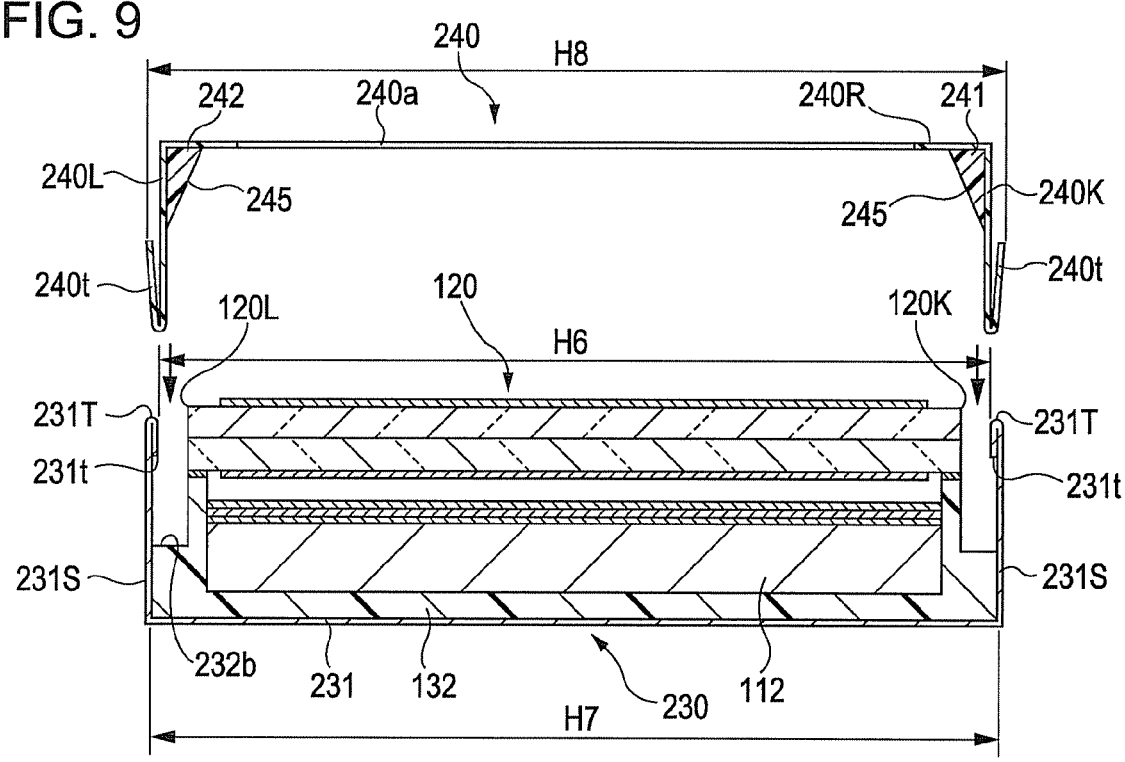
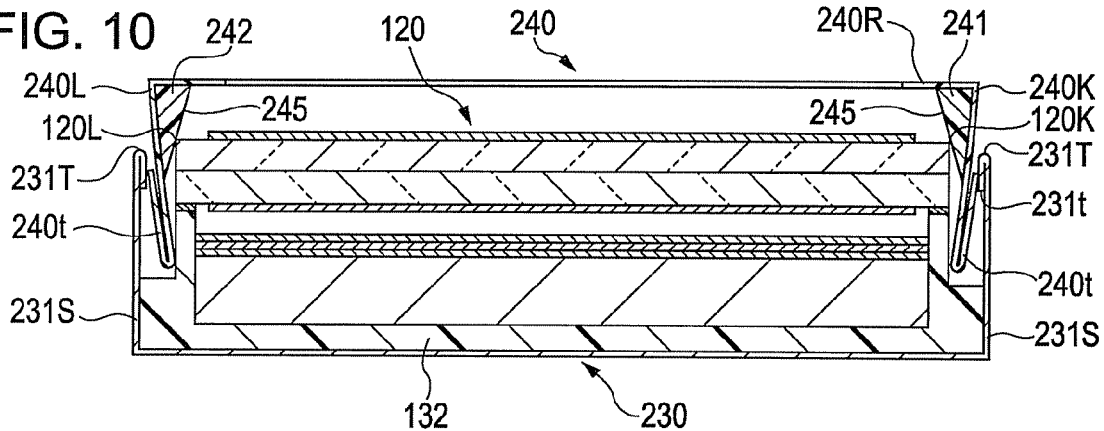

ELECTRO-OPTIC DEVICE, METHOD OF MANUFACTURING ELECTRO-OPTIC DEVICE AND ELECTRONIC EQUIPMENT

BACKGROUND

1. Technical Field

The present invention relates to an electro-optic device, a method of manufacturing an electro-optic device and electronic equipment and, more specifically, to a structure for positioning an electro-optic panel.

2. Related Art

In general, a liquid crystal display panel which is a kind of electro-optic panel which constitutes an electro-optic device is integrated in a housing of electronic equipment such as a mobile phone set for use. In this case, the electronic equipment is provided with a display window for making a display area of the liquid crystal display panel viewable from the outside. When an opened range of the display window and the display area of the liquid crystal display panel are deviated from a normal positional relationship, there arise problems such that the display window and a display screen of the electronic equipment are not aligned, thereby resulting in a defective produce, or that the quality of the product is impaired by the appearance around a display unit.

As a structure of the electro-optic device of this type in the related art, a structure in which the electro-optic panel is positioned on a frame with a jig and then fixed thereto, and then the electro-optic panel is stored in an upper case and a lower case with reference to the frame is known (for example, see JP-A-2005-99616).

However, in JP-A-2005-99616, there is a problem that the jig is necessary for positioning the electro-optic panel to the frame.

SUMMARY

An advantage of some aspects of the invention is that a structure of an electro-optic device or electronic equipment in which positioning of the electro-optic panel with respect to a frame is achieved without using a jig, and a method of manufacturing the same are provided.

The invention is realized by following modes or application examples.

Application Example 1

There is provided an electro-optic device including: an electro-optic panel; a panel supporting member for supporting the electro-optic panel from one of front side and back side of the electro-optic panel; a mounted member to be mounted to the panel supporting member from the other one of the front side and the back side; the electro-optic panel including at least two outer edges opposing to each other in plan view; and the mounted member including a pair of panel positioning guides for guiding the electro-optic panel by guiding the two outer edges respectively.

The electro-optic device in Application Example 1 includes the electro-optic panel, the panel supporting member and the mounted member. The panel supporting member supports the electro-optic panel from one of the front side and the back side of the electro-optic panel. The mounted member is mounted to the panel supporting member from the other one of the front side and the back side of the electro-optic panel. The mounted member includes the pair of panel positioning guides for guiding the electro-optic panel. The electro-optic panel includes at least the two outer edges opposing to each other in plan view. The pair of panel positioning guides guide the electro-optic panel by guiding the two edges, respectively.

In this configuration, since the two outer edges of the electro-optic panel are guided by the pair of panel positioning guides, the electro-optic panel is controlled in position from both sides of the two outer edges. Therefore, the position of the electro-optic panel with respect to the mounted member may be controlled without using the jig.

Application Example 2

The electro-optic device as described above, wherein one of the pair of panel positioning guides opposes one of the two outer edges, the other one of the pair of panel positioning guides opposes the other one of the two outer edges, and the distance between the one panel positioning guide and the other panel positioning guide is reduced from the electro-optic panel toward the other side.

In Application Example 2, one of the pair of panel positioning guides opposes one of the two outer edges, and the other one of the pair of panel positioning guides opposes the other one of the two outer edges. The distance between the one panel positioning guide and the other panel positioning guide is reduced from the electro-optic panel toward the other side. In this configuration, the two outer edges of the electro-optic panel are easily guided.

Application Example 3

The electro-optic device as described above, wherein the two outer edges contact with the respective panel positioning guides.

In Application Example 3, since the two outer edges contact with the respective panel positioning guides, the electro-optic panel may be held by the pair of panel positioning guides.

Application Example 4

The electro-optic device as described above, wherein the each one of the two outer edges and the each panel positioning guide are apart from each other.

In Application Example 4, since the each one of the two outer edges and the each panel positioning guide are apart from each other, an external force that the electro-optic panel receives from the pair of panel positioning guides may be controlled to a low level.

Application Example 5

The electro-optic device as described above, wherein side walls corresponding to the pair of panel positioning guides of the mounted member come into contact with the inner walls of the panel supporting member and hence are deformed inward, and the respective panel positioning guides are brought into contact with the two outer edges of the electro-optic panel by the deformed side walls.

In this configuration, the pair of panel positioning guides may be brought into contact with the two outer edges of the electro-optic panel.

Application Example 6

The electro-optic device as described above, wherein a pair of side walls corresponding to the pair of panel positioning guides of the mounted member include projections directed outward, the panel supporting member includes a pair of side walls opposing the projections of the mounted member, the pair of side walls of the panel supporting member include inner wall portions having a first distance smaller than the distance between the outer sides of the pair of projections and a second distance which is wider than the first distance from the end sides of the pair of side walls; and the pair of projections of the mounted member are arranged on the inner wall portion of the panel supporting member having the second distance so as to oppose to each other.

Application Example 7

The electro-optic device as described above, wherein a pair of side walls corresponding to the pair of panel positioning guides of the mounted member include projections directed outward, the panel supporting member includes a pair of side walls opposing the projections of the mounted member, the pair of side walls of the panel supporting member are set to have a smaller distance between the inner sides of the pair of side walls from the end sides of the pair of side walls than the distance of the outer sides between the pair of projections, the pair of side walls of the panel supporting member include opening at positions opposing the projections of the mounted member, and the pair of projections of the mounted member engage the opening of the panel supporting member.

Application Example 8

The electro-optic device as described above, wherein the pair of panel positioning guides and the two outer edges include members interposed therebetween, respectively.

The electro-optic device in Application Example 8 includes the members interposed between the pair of panel positioning guides and the two outer edges respectively. In this configuration, damages that the electro-optic panel is subjected to by the pair of panel positioning guides are alleviated.

Application Example 9

The electro-optic device as described above, wherein the panel supporting member and the electro-optic panel are adhered via adhesive layers, and the adhesive layers have an adhesive force which allows the electro-optic device to be moved by the pair of panel positioning guides.

In Application Example 9, since the panel supporting member and the electro-optic panel are adhered via the adhesive layers, the force of the panel supporting member to support the electro-optic panel may be increased. Here, the adhesive layers have the adhesive force that allows the electro-optic device to be moved by the pair of panel positioning guides. Therefore, the position of the electro-optic panel with respect to the mounted member may be corrected by the pair of panel positioning guides.

Application Example 10

The electro-optic device as described above, wherein at least two pairs of panel positioning guides opposing along the different directions from each other are provided.

In Application Example 10, since at least the two pairs of panel positioning guides opposing along the different directions from each other are provided, the position of the electro-optic panel may easily be controlled in the directions different from each other. Accordingly, the positioning accuracy of the electro-optic panel may be improved with further easily.

Application Example 11

A method of manufacturing an electro-optic device including: an electro-optic panel; a panel supporting member for supporting the electro-optic panel from one of front side and back side of the electro-optic panel; and a mounted member to be mounted to the panel supporting member from the other one of the front side and the back side, the electro-optic panel including at least two outer edges opposing to each other in plan view, and the mounted member including a pair of panel positioning guides for guiding the electro-optic panel by guiding the two outer edges respectively, including a first step of causing the panel supporting member to support the electro-optic panel, a second step of mounting the mounted member to the panel supporting member after the first step, in which the panel supporting member is caused to support the electro-optic panel in a state in which the electro-optic panel is movable with respect to the panel supporting member in the first step, and the mounted member is mounted to the panel supporting member while bringing the pair of panel positioning guides into contact with the two outer edges in the second step.

The electro-optic device according to the method of manufacturing in Application Example 11 includes the electro-optic panel, the panel supporting member and the mounted member. The panel supporting member supports the electro-optic panel from one of the front side and the back side of the electro-optic panel. The mounted member is mounted to the panel supporting member from the other one of the front side and the back side of the electro-optic panel. The mounted member includes the pair of panel positioning guides for guiding the electro-optic panel. The electro-optic panel has at least the two outer edges opposing to each other in plan view. The pair of panel positioning guides guide the electro-optic panel by guiding the respective two outer edges.

The method of manufacturing in Application Example 11 includes the first step and the second step. The first step is a step of causing the panel supporting member to support the electro-optic panel. The second step is a step of mounting the mounted member to the panel supporting member. The second step is carried out after the first step.

In the first step, the panel supporting member is caused to support the electro-optic panel in the state in which the electro-optic panel is movable with respect to the supporting member. In the second step, the mounted member is mounted to the panel supporting member while bringing the pair of panel positioning guides into contact with the two outer edges.

According to this method of manufacturing, since the two outer edges may be guided by the pair of panel positioning guides, the position of the electro-optic panel may be controlled from the both sides of the two outer edges. Therefore, the position of the electro-optic panel with respect to the mounted member may be controlled without using the jig.

Application Example 12

Electronic equipment includes the electro-optic device described above and a control unit for the electro-optic device.

According to the electronic equipment in Application Example 12, the electro-optic device includes the electro-optic panel, the panel supporting member and the mounted member. The panel supporting member supports the electro-optic panel from one of the front side and the back side of the electro-optic panel. The mounted member is mounted to the panel supporting member from the other one of the front side and the back side. The mounted member includes the pair of panel positioning guides for guiding the electro-optic panel. The electro-optic panel includes at least the two outer edges opposing to each other in plan view. The pair of panel positioning guides guide the electro-optic panel by guiding the two outer edges, respectively.

According to the electro-optic device, since the two outer edges of the electro-optic panel are guided by the pair of panel positioning guides, the electro-optic panel is controlled in position from both sides of the two outer edges. Therefore, the position of the electro-optic panel with respect to the mounted member may be controlled without using the jig. Even when there exists an dimensional error in the electro-optic panel, displacement of the center position of the electro-optic panel may be reduced to an extent smaller than the dimensional error. Consequently, the positioning accuracy of the electro-optic panel may be improved easily.

In the electronic equipment having the electro-optic device, the positioning accuracy of the electro-optic panel may easily be improved.

BRIEF DESCRIPTION OF THE DRAWINGS

The invention will be described with reference to the accompanying drawings, wherein like numbers reference like elements.

FIG. 8 is a schematic cross-sectional view showing a general configuration of the electro-optic device according to a third embodiment.

FIG. 9 is a schematic cross-sectional view showing a state of the electro-optic device before the mounted member is mounted according to the third embodiment.

FIG. 10 is a schematic cross-sectional view showing a state of the electro-optic device during the mounted member is mounted according to the third embodiment.

DESCRIPTION OF EXEMPLARY EMBODIMENTS

Referring now to attached drawings, embodiments will be described. In the respective embodiments shown below, a liquid crystal display device as one of electro-optic device will be described as an example. The liquid crystal display device includes a liquid crystal display panel as an electro-optic panel. The electro-optic device is not limited to the liquid crystal display device, and various types of electro-optic devices, such as Organic EL (Electro Luminescence) device or an electrophoresis display device may also be employed.

First Embodiment

Figure 1:
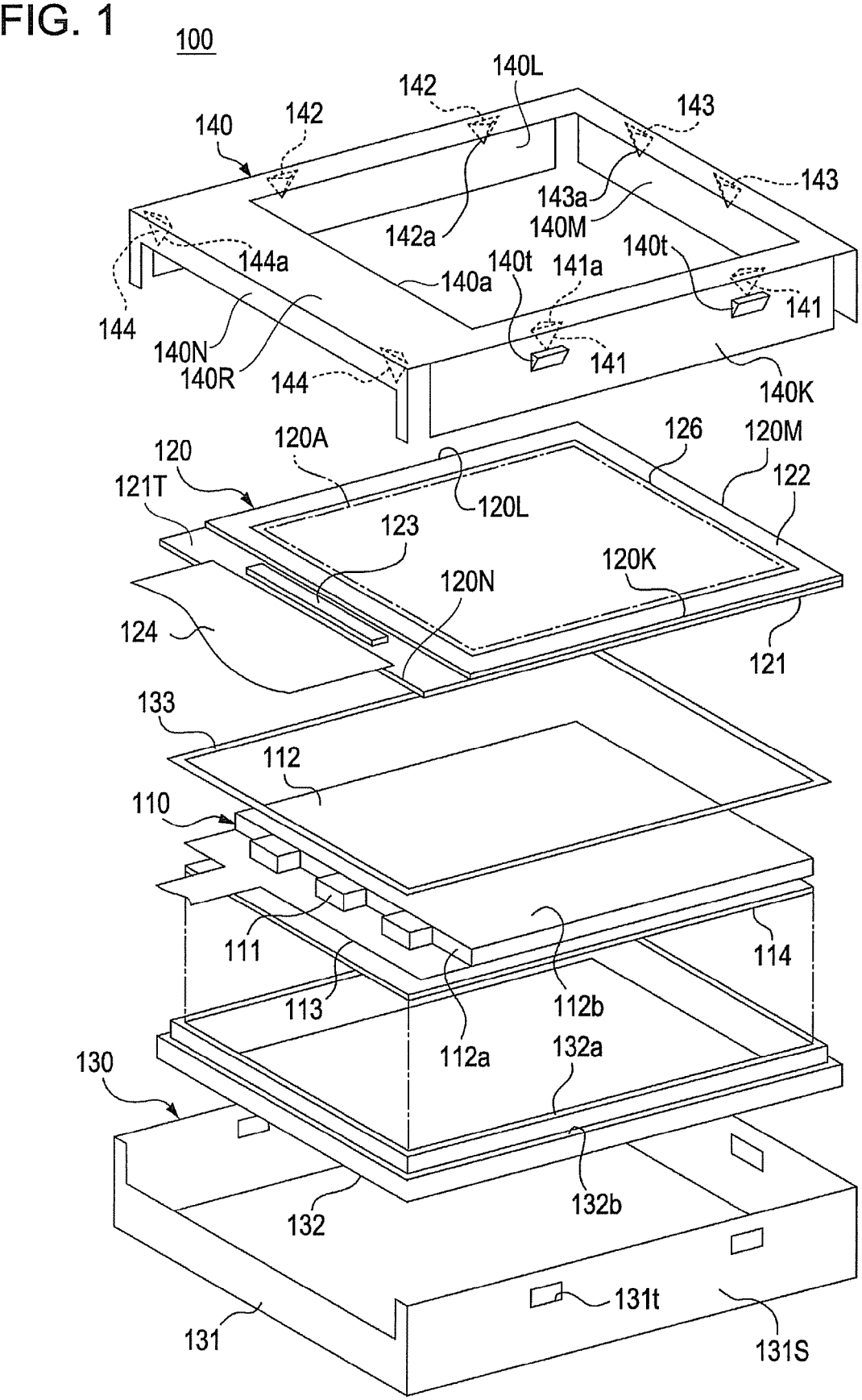
FIG. 1 is a schematic exploded perspective view showing a general configuration of an electro-optic device according to a first embodiment.

FIG. 1 is a schematic exploded perspective view of an electro-optic device (liquid crystal display device) 100 according to a first embodiment. The electro-optic device 100 includes an illuminating unit 110 which constitutes a backlight, an electro-optic panel (liquid crystal display panel) 120 arranged on the front side (observing side) of the illuminating unit 110, a panel supporting member 130 and a mounted member 140.

The illuminating unit 110 includes a light source 111 composed of LED (light emitting diode) or a cold-cathode tube and a light guide panel 112 that introduces light emitted from the light source 111 from a light-incident surface (end surface) 112a and emits from a light-outgoing surface (front surface) 112b. A plurality of the light sources 111 are arranged in the widthwise direction of the light-incident surface 112a on a wiring substrate (flexible wiring substrate) 113. On the back side of the light guide panel 112, a reflection sheet 114 is arranged. Preferably, an optical sheet, not shown, is arranged on the light-outgoing surface 112b as described later. The light guide panel 112 is formed into a rectangular shape in plan view.

The electro-optic panel 120 includes a substrate 121 and a substrate 122 which are formed of glass or the like and thus are transparent adhered to each other, and an electro-optic substance (liquid crystal), not shown, is disposed therebetween. The electro-optic panel 120 includes an outer edge 120K, an outer edge 120L, an outer edge 120M and an outer edge 120N. The outer edge 120K and the outer edge 120L oppose to each other. The outer edge 120M and the outer edge 120N oppose to each other. The direction that the outer edge 120K and the outer edge 120L oppose intersects the direction that the outer edge 120M and the outer edge 120N opposed in plan view.

The substrate 121 is provided with a base panel overhanging portion 121T overhung from the substrate 122. The base panel overhanging portion 121T is provided with a semiconductor chip 123 which constitutes a drive circuit and a wiring substrate (flexible wiring substrate) 124 mounted thereon. Deflecting plates 125, 126 (see FIG. 2 as regards the deflecting plate 125) are arranged on (adhered to) outer surfaces of the substrates 121, 122 as needed. The electro-optic panel 120 is formed into a rectangular shape in plan view, and a display area 120A is also formed into a rectangular shape.

The panel supporting member 130 includes a lower frame 131 and a supporting frame 132 stored in the lower frame 131. Although it is not specifically limited, the lower frame 131 is preferably a metallic frame formed of metal such as stainless steel or aluminum. The supporting frame 132 is preferably a resin frame formed of synthetic resin.

In this embodiment, the lower frame 131 is formed into a rectangular shape in plan view, and has a container shape with an edge with an opening on top. The supporting frame 132 is formed into a rectangular shape in plan view and has a container shape with an edge with an opening on top.

As the supporting frame 132, a configuration of a frame-shaped (rectangular frame shape) opening on top and bottom may also be employed. A configuration in which the lower frame 131 and the supporting frame 132 are formed integrally with the same material may also be employed. Furthermore, a configuration in which the lower frame 131 and the supporting frame 132 formed of different materials are integrated by insert molding or the like is also applicable. In the first embodiment, the supporting frame 132 is positioned at least in the planar direction by being inserted into the lower frame 131. However, a state in which the supporting frame 132 is arranged in the lower frame 131 so as to be movable in the planar direction is also applicable.

The illuminating unit 110 is stored and positioned in the supporting frame 132. The electro-optic panel 120 is arranged on a supporting surface 132a provided around the supporting frame 132. In the first embodiment, the electro-optic panel 120 is adhered to the supporting surface 132a via a double-sided adhesive tape 133. The double-sided adhesive tape 133 includes adhesive layers on front side and back side, so that the electro-optic panel 120 and the supporting frame 132 are adhered. In other words, the electro-optic panel 120 and the panel supporting member 130 are adhered via the adhesive layers of the double-sided adhesive tape 133. However, the double-sided adhesive tape 133 holds the electro-optic panel 120 so as to be capable of moving in the planar direction to an extend required for correction of displacement of the electro-optic panel 120 by the mounted member 140, described later. When the supporting frame 132 is configured so as to be movable in the planar direction with respect to the lower frame 131 as described above, the electro-optic panel 120 may be completely fixed with respect to the supporting frame 132.

The mounted member 140 includes a main body, guides 141, guides 142, guides 143 and guides 144. The main body of the mounted member 140 includes a top panel 140R, a side wall 140K, a side wall 140L, a side wall 140M and a side wall 140N. The mounted member 140 corresponds to an upper frame to be mounted to the lower frame 131. The mounted member 140 opens at the bottom and is configured to be capable of being mounted to the panel supporting member 130. The top panel 140R is provided with a display window 140a. Therefore, the display area 120A of the electro-optic panel 120 is visible from the observing side (upper side in the drawing) via the display window 140a. Although not specifically limited, the main body of the mounted member 140 is formed of metal such as stainless steel or aluminum or synthetic resin such as polyethylene.

In this embodiment, the mounted member 140 is configured to be mounted to the panel supporting member 130. When mounting the mounted member 140 to the panel supporting member 130, the side wall 140K, the side wall 140L, the side wall 140M and the side wall 140N of the mounted member 140 are inserted inside a peripheral wall 131S of the lower frame 131 of the panel supporting member 130.

The side wall 140K and the side wall 140L are provided with engaging portions 140t, respectively. The lower frame 131 is provided with engaging holes 131t on the peripheral wall 131S which constitutes a side wall. The engaging holes 131t are provided at position opposing the respective engaging portions 140t when the mounted member 140 is mounted to the panel supporting member 130. Therefore, when the side wall 140K, the side wall 140L, the side wall 140M and the side wall 140N of the mounted member 140 are inserted inside the peripheral wall 131S of the lower frame 131, the engaging portions 140t and the engaging holes 131t engage. Accordingly, the mounted member 140 is mounted to the panel supporting member 130. A shouldered portion 132b is provided on an outer peripheral portion of the supporting frame 132. Therefore, when the supporting frame 132 is stored in the lower frame 131, a space is formed between the peripheral wall 131S of the lower frame 131 and the supporting frame 132. The side wall 140K, the side wall 140L, the side wall 140M and the side wall 140N of the mounted member 140 are accommodated in this space.

The guides 141, the guides 142, the guides 143 and the guides 144 are provided inside the main body of the mounted member 140. In the first embodiment, the guides 141 to 144 are each provided by more than one (two each). The guides 141 to 144 are each composed of projections projecting from the top panel 140R in the mounting direction (downward in the drawing) of the mounted member 140 with respect to the panel supporting member 130.

The respective guides 141 and the respective guides 142 are provided at position facing to each other, and constitute a pair. The direction in which the guides 141 and the guides 142 face is different from the direction in which the guides 143 and the guides 144 face, and these directions are intersect with each other in plan view.

In the first embodiment, there are provided two each pairs of guides 141 and 142 and pairs of guides 143 and 144. However, the number of pairs is not limited thereto, and must simply be provided by one each pair.

In this embodiment, the respective guides 141 to 144 each have a three-sided pyramid shape which is gradually reduced in thickness from the top panel 140R side (upper side in the drawing) to the distal end side (lower side in the drawing). The guides 141 each have two inclined surfaces 141a. The guides 142 each have two inclined surfaces 142a. The guides 143 each have two inclined surfaces 143a. The guides 144 each have two inclined surfaces 144a.

Figure 2:
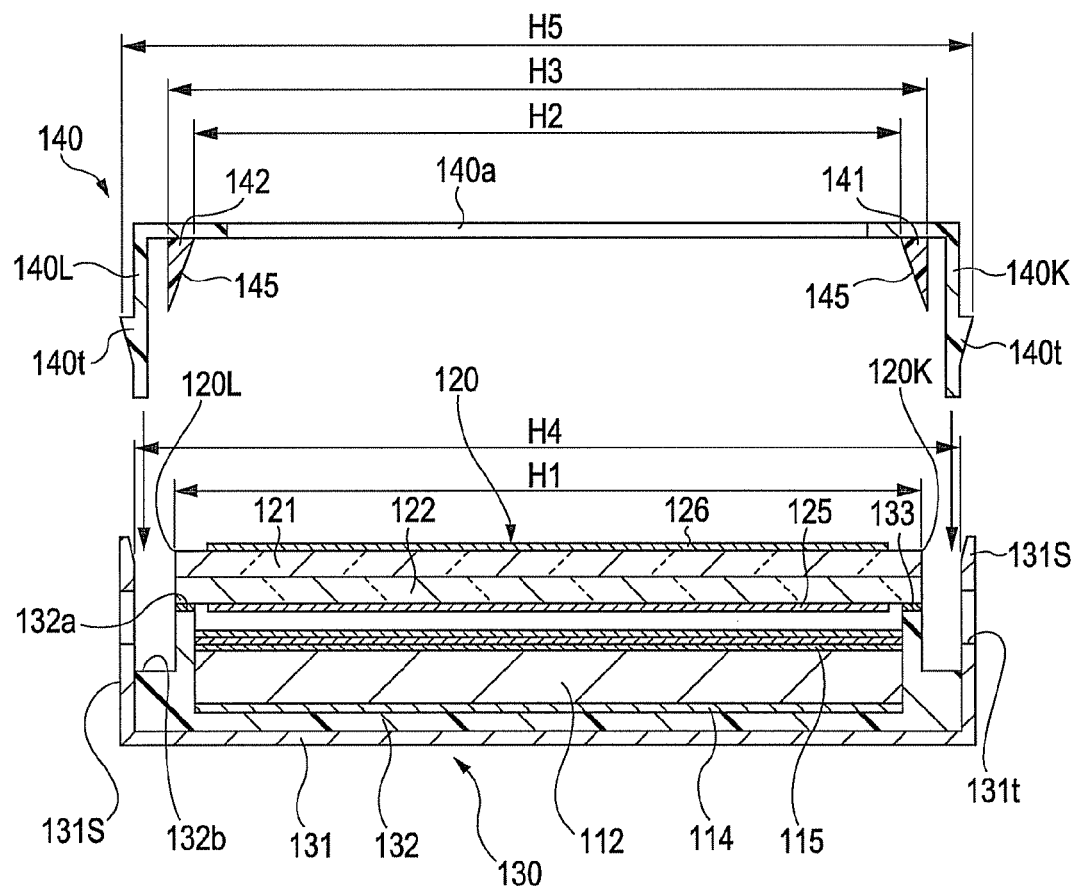
FIG. 2 is a schematic cross-sectional view showing a state of the electro-optic device before a mounted member is mounted according to the first embodiment.

The two inclined surfaces 141a of the one guide 141 commonly have a ridge 145 shown in FIG. 2. It is also the same for other guides 142 to 144, and the guides 142 to 144 each have the ridge 145.

The inclined surfaces 141a to 144a are oriented obliquely inward with respect to the mounting direction. In other words, the inclined surfaces 141a to 144a are inclined with respect to the mounting direction and face the electro-optic panel 120 side in FIG. 1.

The ridge 145 provided commonly for the two inclined surfaces 141a of the respective guides 141 is inclined with respect to the mounting direction and opposes the outer edge 120K of the electro-optic panel 120. In the same manner, the ridge 145 provided commonly for the two inclined surfaces 142a of the guides 142 is inclined with respect to the mounting direction and opposes the outer edge 120L of the electro-optic panel 120. The ridge 145 provided commonly for the two inclined surfaces 143a of the guides 143 is inclined with respect to the mounting direction and opposes the outer edge 120M of the electro-optic panel 120. The ridge 145 provided commonly for the two inclined surfaces 144a of the guides 144 is inclined with respect to the mounting direction and opposes the outer edge 120N of the electro-optic panel 120.

In the configuration as described above, the respective guides 141 to 144 are, as described later, brought into contact respectively with the outer edges 120K, 120L, 120M and 120N of the electro-optic panel 120 at the ridge 145. Therefore, a force of constraint in the widthwise direction is little provided, so that there is no risk of providing an unnecessary distortion or the like to the electro-optic panel 120. The guides 141 to 144 each are not limited to the configuration having the two each inclined surfaces 141a to 144a, and a configuration with a single inclined surface is also applicable. For example, a configuration such that flat inclined surfaces each having a width along the corresponding outer edges 120K, 120L, 120M and 120N of the electro-optic panel 120 are provided as the single inclined surface is also considered. Alternatively, a configuration in which rib-shaped members extending along the respective outer edges 120K, 120L, 120M and 120N of the electro-optic panel 120 are provided as the guides 141 to 144 may also be employed.

In the first embodiment, the pair of guides 141 and 142 are provided at positions with an area for arranging the electro-optic panel 120 interposed therebetween, and the inclined surfaces 141a, 142a each are arranged so as to directly oppose the outer edges 120K, 120L of the electro-optic panel 120 respectively. The other pair of guides 143 and 144 are provided at positions with the area for arranging the electro-optic panel 120 interposed therebetween in the direction different from the guides 141 and 142, and the respective inclined surfaces 143a, 144a are arranged so as to directly oppose the respective outer edges 120M, 120N of the electro-optic panel 120. In this manner, with the provision of the plurality of pairs of guides 141 and 142 and the guides 143 and 144 having the electro-optic panel 120 interposed from the different directions, positioning accuracy of the electro-optic panel 120 in the planar direction is further improved.

The respective guides 141 to 144 are provided at positions corresponding to the respective outer edges 120K, 120L, 120M and 120N of the electro-optic panel 120 of the mounted member 140. The guides 141 to 144 are formed of a material which is subjected to resilient deformation more than the main body of the mounted member 140. In the first embodiment, the main body of the mounted member 140 is formed of a metal frame. The guides 141 to 144 are configured with resin projection formed integrally with the main body of the mounted member 140 by resin molding. The configuration of the mounted member 140 is not limited to the configurations as described above, and a configuration in which the main body of the mounted member 140 and the respective guides 141 to 144 are formed integrally of the same material (for example, synthetic resin) may also be employed.

Figure 3:
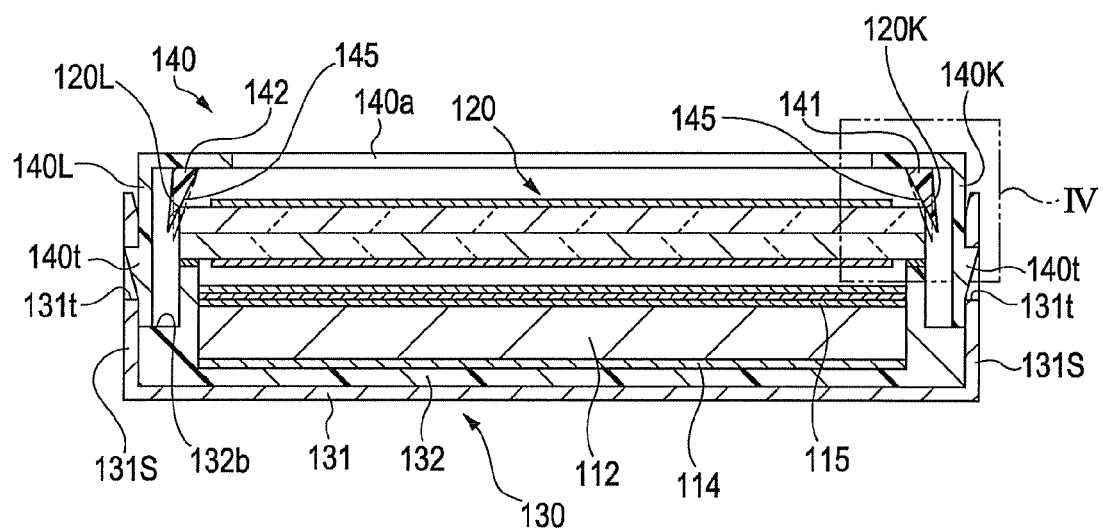
FIG. 3 is a schematic cross-sectional view showing a state of the electro-optic device after the mounted member is mounted according to the first embodiment.

FIG. 2 is a cross-sectional view of a state before mounting the mounted member 140 in the first embodiment, and FIG. 3 is a cross-sectional view of a state after mounting the same. The illuminating unit 110 is stored in the panel supporting member 130. Here, an optical sheet 115 is arranged on the light guide panel 112 as needed. Then, the electro-optic panel 120 is arranged on the supporting frame 132 of the panel supporting member 130 in which the illuminating unit 110 is accommodated. In this case, the electro-optic panel 120 may be adhered to the supporting surface 132a of the supporting frame 132 via the double-sided adhesive tape 133. However, when the electro-optic panel 120 is firmly fixed, correction of displacement cannot be made. Therefore, it is necessary to use the tape having adhesive layers which allows the electro-optic panel 120 to move in the planar direction.

Subsequently, the mounted member 140 is mounted to the panel supporting member 130 from above. At this time, the side wall 140K, the side wall 140L, the side wall 140M and the side wall 140N of the mounted member 140 are inserted between the peripheral wall 131S of the lower frame 131 and the supporting frame 132 as shown in FIG. 2.

Here, the electro-optic panel 120 is set to have a distance H1 between the outer edge 120K and the outer edge 120L. The mounted member 140 is set to have a distance H2 between the guides 141 and the guides 142 on the top panel 140R side. The distance between the insides of the guides 141 and the guides 142 on the distal end (the end of the electro-optic panel 120) side is set to H3. These distances H1, H2 and H3 satisfy the relation of an expression (1) shown below.

$$H3 > H1 > H2 \tag{1}$$

The relation shown above is also satisfied for the pair of guides 143 and 144 and the outer edges 120M and 120N.

With the relation shown above, the guides 141 and the 142 come into contact with the outer edges 120K and 120L in the course of mounting the mounted member 140 to the panel supporting member 130, respectively, as shown in FIG. 3. In the same manner, the guides 143 and 144 come into contact with the outer edge 120M and 120N in the course of mounting the same.

Therefore, the position of the electro-optic panel 120 in the planar direction may be corrected by external forces applied from the guides 141 to 144. Here, the guides 141 to 144 have rigidity to an extent which is able to come into contact with the respective outer edges 120K, 120L, 129M and 120N of the electro-optic panel 120, and correct the position thereof in the plane.

Depending on the initial position of the electro-optic panel 120 in the plane or the distance between the pair of guides 141 and 142, the position of the electro-optic panel 120 in the plane may be corrected by coming into contact with only one of the pair of guides 141 and 142. Here, the distance H2 and H3 or the angles of inclination of the respective inclined surfaces 141a and 142a are determined according to the allowable width of the position of the electro-optic panel 120 in the plane or variations in dimension or height of the both outer edges of the electro-optic panel 120.

The engaging portions 140t engage the engaging holes 131t as shown in FIG. 3. Accordingly, mounting of the mounted member 140 to the panel supporting member 130 is completed.

Here, the lower frame 131 is set to have a distance H4 between the inner sides of the peripheral wall 131S opposing to each other with the intermediary of the electro-optic panel 120 therebetween as shown in FIG. 2. The mounted member 140 is set to have a distance H5 between the engaging portions 140t opposing to each other. These distances H4 and H5 satisfy the relation of an expression (2) shown below.

$$H5 > H4 \tag{2}$$

With the relation shown above, the engaging portions 140t and the engaging holes 131t are engageable.

In the first embodiment, the distance between the insides of the pair of guides 141 and 142 is reduced from the distal end side toward the top panel 140R side.

In the first embodiment, after having mounted the mounted member 140 to the panel supporting member 130, the guides 141 to 144 contact with the electro-optic panel 120 as shown in FIG. 3. Here, the guides 141 to 144 are formed of the material which is subjected to resilient deformation. Therefore, even when the guides 141 to 144 contact with the electro-optic panel 120 after having mounted the mounted member 140 to the panel supporting member 130, probability of occurrence of excessive stress or distortion in the electro-optic panel 120 is lowered. The shape of the guides 141 and 142 before resilient deformation are shown by double-dashed lines in FIG. 3.

In the first embodiment, when mounting the mounted member 140 to the panel supporting member 130, the position of the electro-optic panel 120 in the plane is corrected from the both sides of the outer edge 120K side and the outer edge 120L side by the pair of guides 141 and 142. In the same manner, the position of the electro-optic panel 120 in the plane is corrected from the both sides of the outer edge 120M side and the outer edge 120N side by the pair of guides 143 and 144. Therefore, even though the dimensional error exists in the electro-optic panel 120, the positional displacement of the display area 120A with respect to the display window 140a may be reduced to a level smaller than the dimensional error. Consequently, the positioning accuracy of the electro-optic panel 120 may be easily improved.

In the first embodiment, a configuration in which the electro-optic panel 120 and the panel supporting member 130 (the supporting frame 132) are adhered via the double-sided adhesive tape 133 is employed. However, the configurations of the electro-optic panel 120 and the panel supporting member 130 are not limited thereto. A configuration in which the double-sided adhesive tape 133 is omitted is also employed in the configurations of the electro-optic panel 120 and the panel supporting member 130. A configuration in which the supporting frame 132 is set to be movable with respect to the lower frame 131 in the planar direction may also be employed.

In this configuration, the position of the electro-optic panel 120 with respect to the lower frame 131 may be changed with a slight external force. Therefore, when mounting the mounted member 140 to the panel supporting member 130, the external forces that the respective guides 141 to 144 apply to the electro-optic panel 120 may be restrained to a lower level. Accordingly, probability of the electro-optic panel 120 being damaged by the guides 141 to 144 may be restrained to a lower level. Furthermore, easy improvement of the positioning accuracy of the electro-optic panel 120 may also be achieved.

In this configuration as well, the guides 141 to 144 and the electro-optic panel 120 are maintained in contact with each other as after having mounted the mounted member 140 to the panel supporting member 130. Therefore, a retaining force of the electro-optic panel 120 in the electro-optic device 100 is secured. However, the configuration in which the electro-optic panel 120 and the panel supporting member 130 are adhered via the double-sided adhesive tape 133 is also preferable in increasing the retaining force of the electro-optic panel 120 in the electro-optic device 100.

In the first embodiment, the configuration in which the guides 141 to 144 come into contact with the outer edges 120K, 120L, 120M and 120N of the electro-optic panel 120 respectively is employed. However, the invention is not limited to this configuration, and a configuration in which a separate member is interposed between the guides 141 to 144 and the outer edges 120K, 120L, 120M and 120N is also employed. In this case, the configuration must simply be such that the guides 141 to 144 guide the outer edges 120K, 120L, 120M and 120N of the electro-optic panel 120 as a result when mounting the mounted member 140 to the panel supporting member 130. As the separate member, for example, a frame member which covers the outer periphery of the electro-optic panel 120, shock absorbing members provided between the electro-optic panel 120 and the respective guides 141 to 144, or a cover glass for protecting the display area 120A of the electro-optic panel 120 are possible. This point is also applicable to other embodiments described later.

Figure 4A:
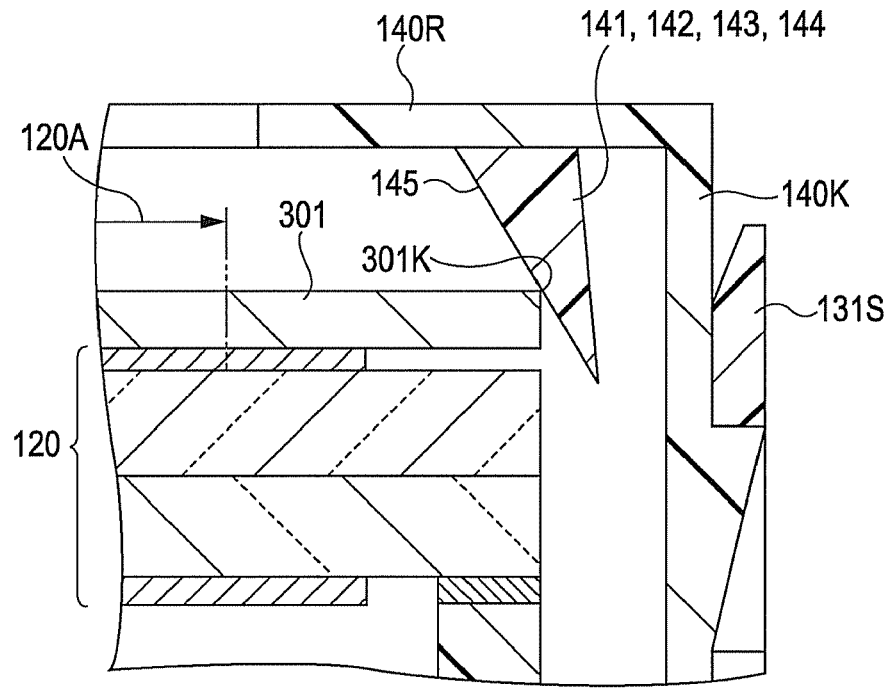
FIG. 4A and FIG. 4B are enlarged views of a portion corresponding to a part IV in FIG. 3.

For example, when the separate member is the cover glass, the guides 141 to 144 come into contact with an outer edge 301K of a cover glass 301 as shown in FIG. 4A which is an enlarged view of a portion which corresponds to a portion A in FIG. 3.

Figure 4B:
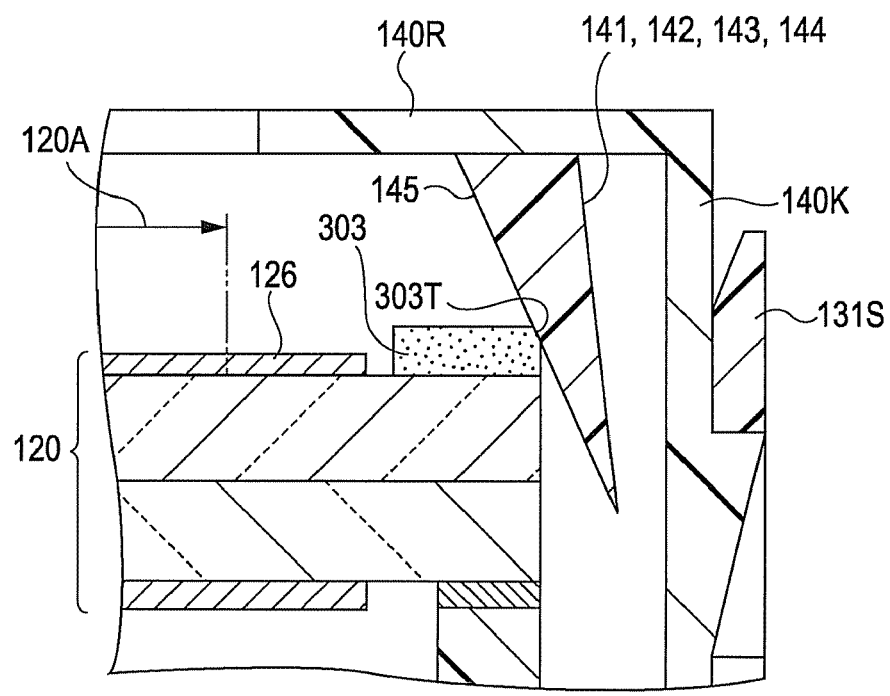

When the separate member is the shock absorbing member, the guides 141 to 144 come into contact with a shock absorbing member 303 as shown in FIG. 4B which is an enlarged view of the portion which corresponds to the portion A in FIG. 3. A contact portion 303T of the shock absorbing member 303 is deformed by the external forces applied by the guides 141 to 144. The shock absorbing member 303 is provided outside of the display area 120A of the electro-optic panel 120. Therefore, an image displayed in the display area 120A is viewable without being impaired by the shock absorbing member 303.

In the first embodiment, the shock absorbing member 303 is provided outside the deflecting plate 126. Therefore, overlapping of the shock absorbing member 303 and the deflecting plate 126 is prevented. Accordingly, the thickness of the electro-optic device 100 may be reduced easily.

In the first embodiment, the guides 141 to 144 must simply at least come into contact with the electro-optic panel 120 or the members described above in the course of mounting the mounted member 140 to the panel supporting member 130. Accordingly, the planer position of the electro-optic panel 120 in the plane may be controlled in the course of mounting the mounted member 140 to the panel supporting member 130. Therefore, a configuration in which the guides 141 to 144 and the electro-optic panel 120 (or the members shown above, hereinafter) are not in contact with each other after having mounted the mounted member 140 to the panel supporting member 130 as in other embodiments described later, and hence are apart from each other may also be employed.

Second Embodiment

Figure 5:
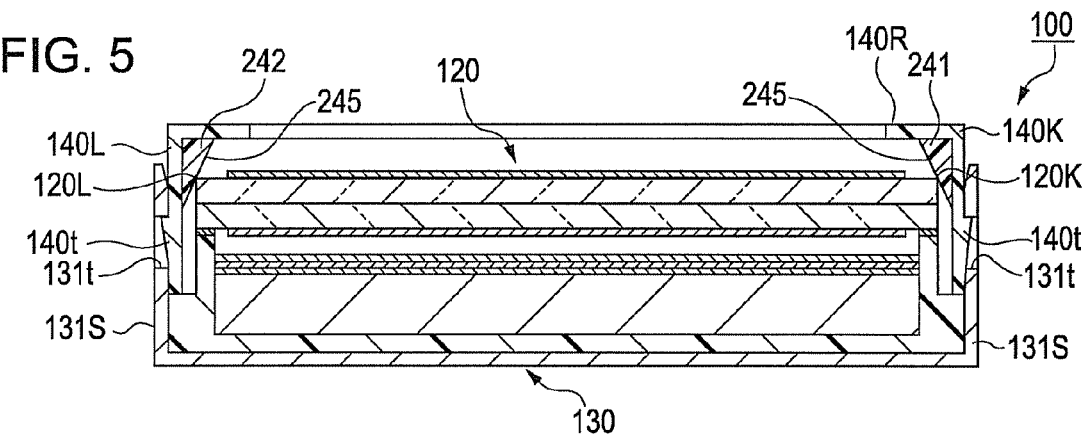
FIG. 5 is a schematic cross-sectional view showing a general configuration of the electro-optic device according to a second embodiment.

A second embodiment will be described. In the second embodiment, as shown in FIG. 5, guides 241 are employed instead of the guides 141 in the first embodiment, and guides 242 are employed instead of the guides 142. Although not shown, guides 243 are employed instead of the guides 143 in the first embodiment and guides 244 are employed instead of the guides 144.

The configuration of the electro-optic device 100 in the second embodiment is the same as that of the electro-optic device 100 in the first embodiment except for these points shown above. Therefore, in the description shown below, the same parts as in the first embodiment are designated by the same reference numerals and the description thereof is omitted.

Figure 6:
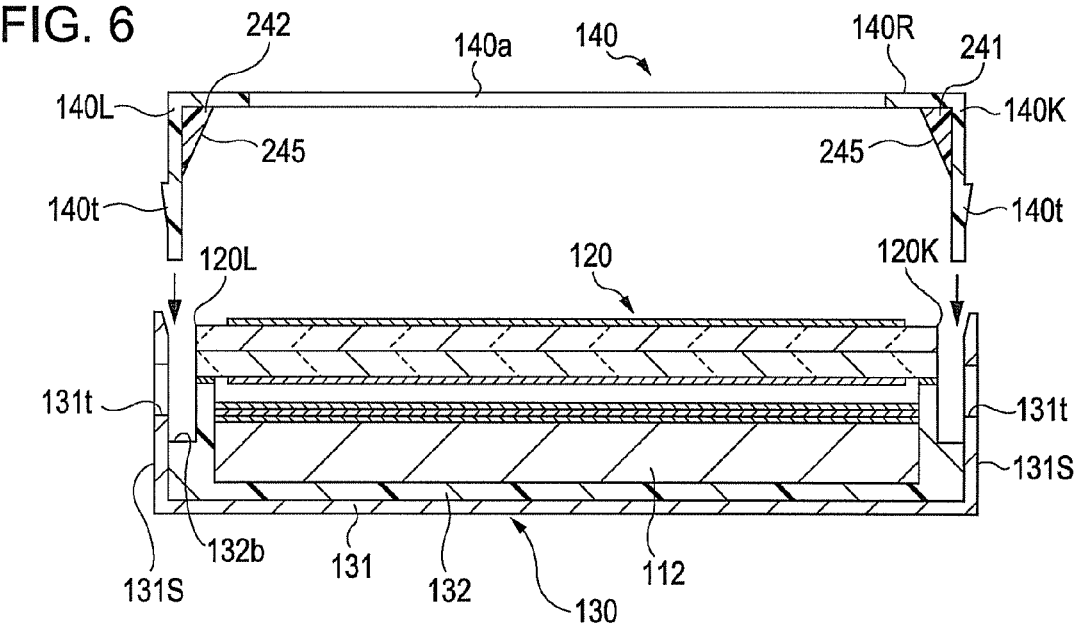
FIG. 6 is a schematic cross-sectional view showing a state of the electro-optic device before the mounted member is mounted according to the second embodiment.

The respective guides 241 to 244 are formed inside the side wall 140K, the side wall 140L, the side wall 140M and the side wall 140N of the mounted member 140 as shown in FIG. 6. The guides 241 to 244 are fixed from the inner surface of the top panel 140R of the mounted member 140 to the respective inner surfaces of the side wall 140K, the side wall 140L, the side wall 140M and the side wall 140N. Therefore, the guides 241 to 244 have higher rigidity than the guides 141 to 144 in the first embodiment. The guides 241 to 244 are formed with inclined surfaces 241a, 242a, 243a and 244a respectively as in the first embodiment. The guides 241 to 244 each have a ridge 245. The guides 241 to 244 are the same as the guides 141 to 144 in the first embodiment in that they are configured to be reduced gradually in thickness from the top panel 140R side (upper side in the drawing) toward the distal end side (lower side in the drawing).

Figure 7:
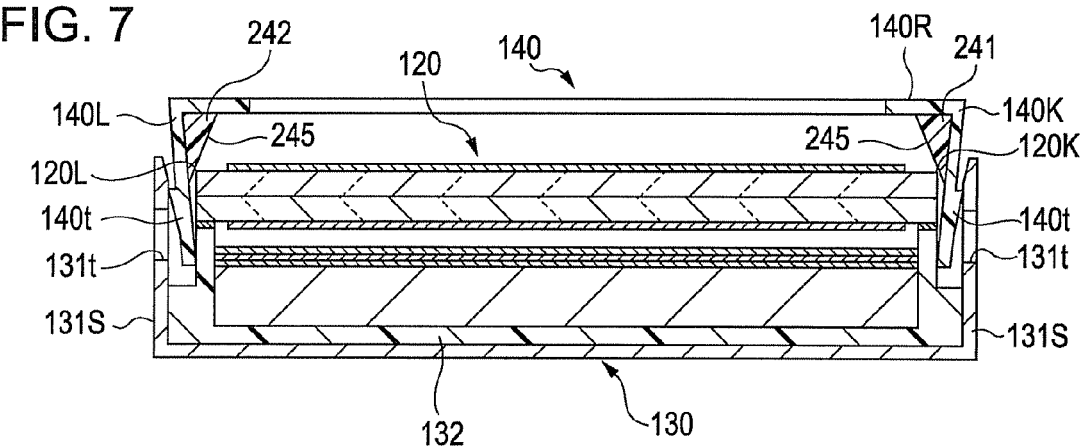
FIG. 7 is a schematic cross-sectional view showing a state of the electro-optic device during the mounted member is mounted according to the second embodiment.

In the second embodiment, as shown in FIG. 7, the position of the electro-optic panel 120 in the plane is controlled by the respective guides 241, 242 coming into contact with the respective outer edges 120K, 120L of the electro-optic panel 120 when mounting the mounted member 140 to the panel supporting member 130. At this time, the respective engaging portions 140t on the side wall 140K and the side wall 140L of the mounted member 140 are pressed inward by the peripheral wall 131S of the lower frame 131, and the side wall 140K and the side wall 140L each are resiliently deformed inwardly. Therefore, the guides 241, 242 formed on the inner surfaces of the side wall 140K and the side wall 140L are displaced inward in association with the resilient deformation of the side wall 140K and the side wall 140L. At this time, the respective outer edges 120K, 120L of the electro-optic panel 120 are pressed inwardly by the pair of guides 241 and 242. It is also possible to configure in such a manner that the lower ends of the side wall 140K and the side wall 140L are guided by the outer peripheral surface of the supporting frame 132 as shown in the drawing.

Subsequently, as shown in FIG. 5, when the engaging portions 140t engage the engaging holes 131t, at least part of the resilient deformation of the side wall 140K and the side wall 140L is restored and, in association with it, the respective guides 241, 242 are displaced outward, although it is slightly.

In the second embodiment, the guides 241, 242 are displaced inwardly temporarily when mounting the mounted member 140 to the panel supporting member 130. Therefore, the outer edges 120K, 120L of the electro-optic panel 120 are guided by the pair of guides 241 and guides 242. Accordingly, the position of the electro-optic panel 120 in the plane may be controlled. Then, since the positions of the guides 241, 242 are restored outward after having mounted, reduction of the risk of application of excessive stress or distortion to the electro-optic panel 120 by the guides 241, 242 is achieved.

In the second embodiment, the guides 241, 242 contact with the outer edges 120K, 120L of the electro-optic panel 120 respectively in the state in which the mounted member 140 is mounted to the panel supporting member 130 as shown in FIG. 5. However, even though the guides 241, 242 contact with the outer edges 120K, 120L, the reduction of the stress or the distortion is certainly achieved since the guides 241, 242 displaced inwardly in the mounting process are restored outward after having mounted.

As the supporting frame 132, the configuration of the frame-shaped (rectangular frame shape) opening on top and bottom may also be employed. The configuration in which the lower frame 131 and the supporting frame 132 are formed integrally with the same material may also be employed. Furthermore, the configuration in which the lower frame 131 and the supporting frame 132 formed of different materials are integrated by insert molding or the like is also applicable. In the second embodiment, the supporting frame 132 is positioned at least in the planer direction by being inserted into the lower frame 131. However, the state in which the supporting frame 132 is arranged in the lower frame 131 so as to be movable in the planer direction is also applicable.

Third Embodiment

A third embodiment will be described. In the third embodiment, as shown in FIG. 8, a mounted member 240 is employed instead of the mounted member 140 in the second embodiment, and a panel supporting member 230 is employed instead of the panel supporting member 130.

The configuration of the electro-optic device 100 in the third embodiment is the same as that of the electro-optic device 100 in the second embodiment except for these points. Therefore, in the description shown below, the same parts as in the second embodiment are designated by the same reference numerals and the description thereof is omitted.

In the third embodiment, as shown in FIG. 9, a lower frame 231 and a main body of the mounted member 240 are configured of a thin-plate shaped metal frame.

A peripheral wall 231S of the lower frame 231 has a thick portion 231T on the upper end side. The thick portion 231T has a configuration being bent inward at the upper end of the peripheral wall 231S. With the provision of this bent structure, a engaging shoulder 231t is formed at the lower end of the thick portion 231T. This bent structure is often referred to as "hemming".

The side wall 240K and the side wall 240L of the mounted member 240 each have engaging strips 240t. The engaging strips 240t have a configuration such that the lower ends of the side wall 240K and the side wall 240L respectively bent outward so as to extend obliquely upward. The guides 241 to 244 are fixed from the inner surface of a top panel 240R of the mounted member 240 to the respective inner surfaces of the side wall 240K, the side wall 240L, a side wall 240M and a side wall 240N as in the second embodiment. The structure is the same as in the first and second embodiments in that they are configured to be reduced gradually in thickness from the top panel 240R side (upper side in the drawing) toward the distal end side (lower side in the drawing).

Here, the lower frame 231 is set to have a distance H6 between the inner sides of the thick portions 231T opposing to each other with intermediary of the electro-optic panel 120. It is also set to have a distance H7 between the inner sides of the peripheral wall 231S opposing to each other with the intermediary of the electro-optic panel 120. The distances H6 and H7 satisfy the relation of an expression (3) shown below.

$$H7 > H6 \quad (3)$$

On the other hand, the mounted member 240 is set to have a distance H8 between the outer sides of the engaging strips 240t opposing to each other. The distances H6 and H8 satisfy the relation of an expression (4) shown below.

$$H8 > H6 \quad (4)$$

With the relation shown above, the engaging strips 240t and an engaging shoulder 231t are engageable.

In the third embodiment, the side wall 240K and the side wall 240L of the mounted member 240 are inserted inside the peripheral wall 231S of the lower frame 231, so that the engaging strips 240t, the side wall 240K and the side wall 240L are resiliently deformed inward by the thick portion 231T of the lower frame 231 as shown in FIG. 10. The guides 241, 242 formed on the inner surfaces of the side wall 240K and the side wall 240L are displaced inward in association with the resilient deformation of the side wall 240K and the side wall 240L. In this case, the guides 241, 242 come into contact with the outer edges 120K, 120L of the electro-optic panel 120, respectively. Accordingly, the outer edges 120K, 120L of the electro-optic panel 120 are pressed inward by the pair of guides 241 and 242, and the position of the electro-optic panel 120 in the plane is controlled. It is also possible to configure in such a manner that the lower ends of the side wall 240K and the side wall 240L are guided by the outer peripheral surface of the supporting frame 132 as shown in the drawing.

Subsequently, the distal ends of the engaging strips 240t engage the engaging shoulder 231t as shown in FIG. 8. Accordingly, the mounted member 240 is mounted to the panel supporting member 230. At this time, at least part of resilient deformation (FIG. 10) of the engaging strips 240t, the side wall 240K and the side wall 240L is restored as shown in FIG. 8. By restoration of at least part of the resilient deformation of the side wall 240K and the side wall 240L, the guides 241, 242 are displaced outward. Therefore, the guides 241, 242 are moved away from the outer edges 120K, 120L of the electro-optic panel 120, respectively.

In the third embodiment, after having mounted the mounted member 240 to the panel supporting member 230, external forces that the electro-optic panel 120 receives from the guides 241, 242 are released. Therefore, the risk of applying unnecessary stress or distortion to the electro-optic panel 120 is eliminated. However, in this case as well, the ridges 245 oppose the outer edge 120K, 120L, 120M and 120N of the electro-optic panel 120 respectively with the intermediary of a slight clearance. Therefore, the function to substantially retain the electro-optic panel 120 in the planer direction and the vertical direction is secured.

As the supporting frame 132, the configuration of a frame-shaped (rectangular frame shape) opening on top and bottom may also be employed. A configuration in which the lower frame 231 and the supporting frame 132 are formed integrally with the same material may also be employed. Furthermore, a configuration in which the lower frame 231 and the supporting frame 132 formed of different materials are integrated by insert molding or the like is also applicable. In the second embodiment, the supporting frame 132 is positioned at least in the planer direction by being inserted into the lower frame 231. However, the supporting frame 132 and the lower frame 231 are not limited to this configuration, and a configuration in which the supporting frame 132 is arranged in the lower frame 231 so as to be movable in the planer direction may also be employed.

Figure 11:
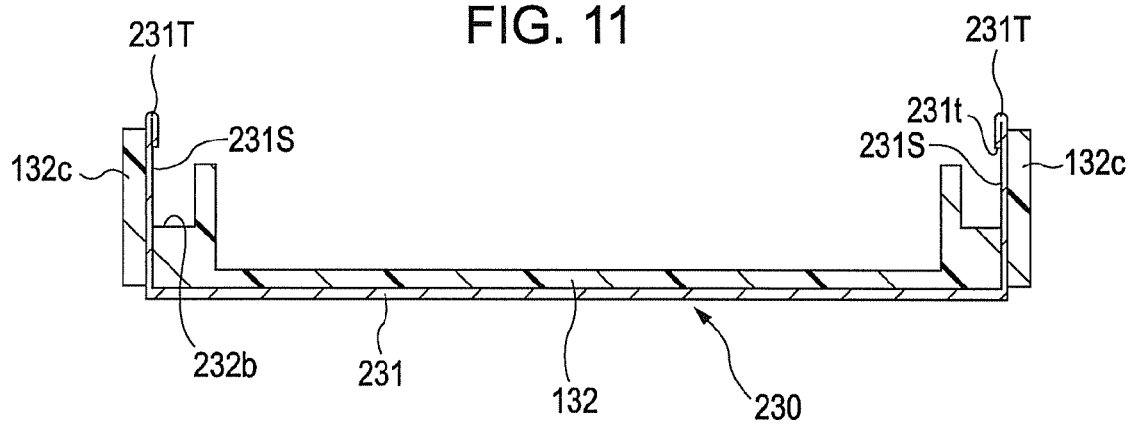
FIG. 11 is a schematic cross-sectional view showing an example of a configuration in which a lower frame and a supporting frame are integrated according to the embodiment.

As the configuration in which the lower frame 231 and the supporting frame 132 integrated by the insert molding, for example, a configuration shown in FIG. 11 is considered. In this configuration, the peripheral wall 231S of the lower frame 231 is interposed between the supporting frame 132 and a side wall portion 132c. The supporting frame 132 and the side wall portion 132c are integrally formed by the insert molding. In this configuration, the labor to insert the supporting frame 132 to the lower frame 231 may be omitted. The labor to position the supporting frame 132 with respect to the lower frame 231 may also be omitted. Therefore, the manufacture efficiency of the electro-optic device 100 may easily be improved.

In the first embodiment, the single guide 141 includes the two inclined surfaces 141a. The ridge 145 which is provided commonly for these two inclined surfaces 141a comes into contact with the electro-optic panel 120, the cover glass 301 or the shock absorbing member 303. Other guides 142 to 144 are also the same.

In the second embodiment and the third embodiment, the single guide 241 includes the two inclined surfaces 241a. The ridge 245 which is provided commonly for these two inclined surfaces 241a comes into contact with the electro-optic panel 120, the cover glass 301 or the shock absorbing member 303. Other guides 242 to 244 are also the same.

Figure 12:
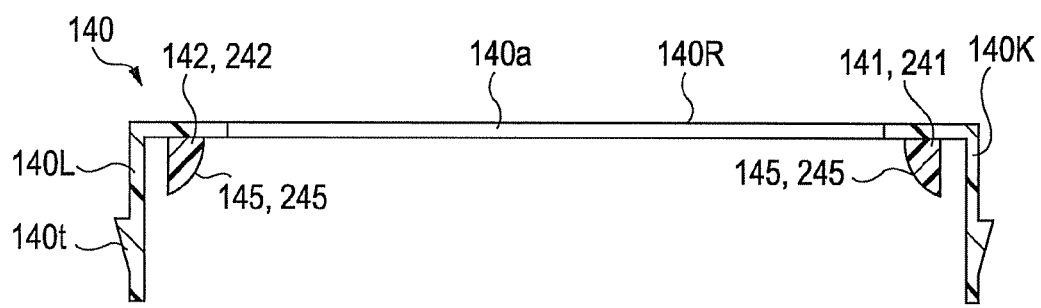
FIG. 12 is a schematic cross-sectional view showing another example of a guide according to the embodiment.

In the first embodiment, the second embodiment and the third embodiment, the case in which the ridge 145 and the ridge 245 each assume a straight line is exemplified. However, the ridge 145 and the ridge 245 are not limited to the straight line, and may be a curved line as shown in FIG. 12. This may be applied also to a configuration in which the single guide 141 (241) includes the single inclined surface 141a (241a). In other words, in the configuration in which the single guide 141 (241) includes the single inclined surface 141a (241a), a curved surface may also be applied as the single inclined surface 141a (241a).

In other words, when the distance between the inner sides of the pair of guides 141 and 142 is reduced from the distal end side toward the top panel 140R, the shape of the ridge 145 or the number of the inclined surfaces 141a, 142a may be set as desired. This may be applied also to the other guides 143, 144 or the guides 241 to 244.

Figure 13:
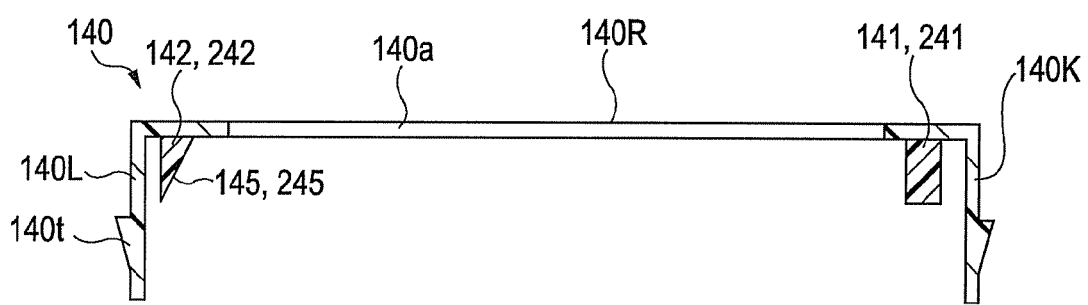
FIG. 13 is a schematic cross-sectional view showing still another example of the guide according to the embodiment.

In the first embodiment, the second embodiment and the third embodiment, the case in which the ridge 145 and the ridge 245 are inclined with respect to the mounting direction in each of the pair of guides 141 and 142 (241 and 242) is exemplified. However, the ridge 145 and the ridge 245 are not limited thereto, and a configuration in which only at least one of the pair of guides 141 and 142 (241 and 242) is inclined with respect to the mounting direction may also be employed as shown in FIG. 13. The pair of guides 141 and 142 (241 and 242) must simply have a configuration such that the distance between the inner sides of the guides 141 and 142 (241 and 242) is reduced from the distal end side toward the top panel 140R (240R). The pair of guides 143 and 144 (243 and 244) are the same.

In the first embodiment, the second embodiment and the third embodiment, the guides 141 to 144 and the guides 241 to 244 respectively correspond to panel positioning guides. The side walls 140K, 140L and the side walls 240K, 240L correspond to side walls corresponding to the pair of panel positioning guides. The inner surface of the peripheral wall 131S and the inner surface of the thick portion 231T correspond to an inner wall of the panel supporting member. The engaging portions 140t and the engaging strips 240t correspond to projections. The distance H6 corresponds to a first distance, and the distance H7 corresponds to a second distance. The peripheral wall 131S corresponds to a pair of side walls opposing the projections of the mounted member. The engaging holes 131t correspond to openings.

Electronic Equipment

Figure 14:
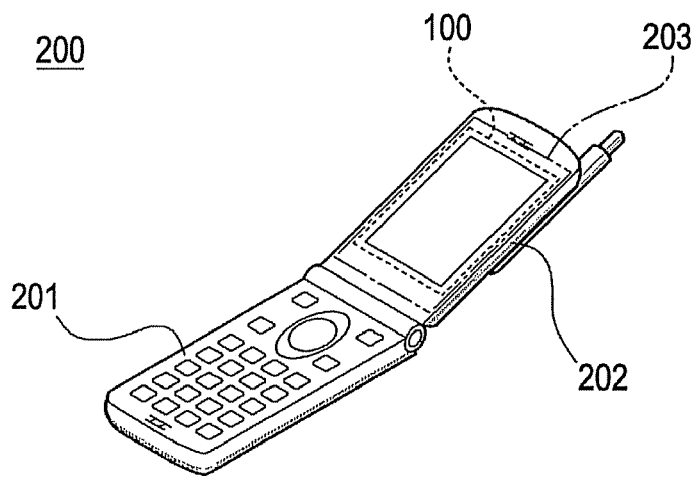
FIG. 14 is a schematic perspective view of electronic equipment.

An embodiment in which the electro-optic device according to the respective embodiments shown above is mounted to electronic equipment will be described. Electronic equipment 200 has the electro-optic device 100 mounted to a display unit thereof, and FIG. 14 shows a mobile phone set as an embodiment of the electronic equipment according to the invention. The electronic equipment 200 shown here includes an operating unit 201 having a plurality of operating buttons and a mouthpiece and a display unit 202 having an earpiece or the like, and the electro-optic device 100 described above is integrated in the interior of the display unit 202. The display area 120A (see FIG. 1) of the electro-optic device 100 is viewable on the front surface (inner surface) of the display unit 202. In this case, a display control circuit, described later, for controlling the electro-optic device 100 is provided in the interior of the electronic equipment 200, and the display control circuit determines the display mode of the electro-optic device 100.

In the electronic equipment 200, the mounted members 140, 240 may be configured with a frame fixed to the electronic equipment 200 side, or a housing of the electronic equipment 200. In this configuration, the display screen may be set to a position matching the opening shape of the display unit 202 with a high degree of accuracy.

Figure 15:
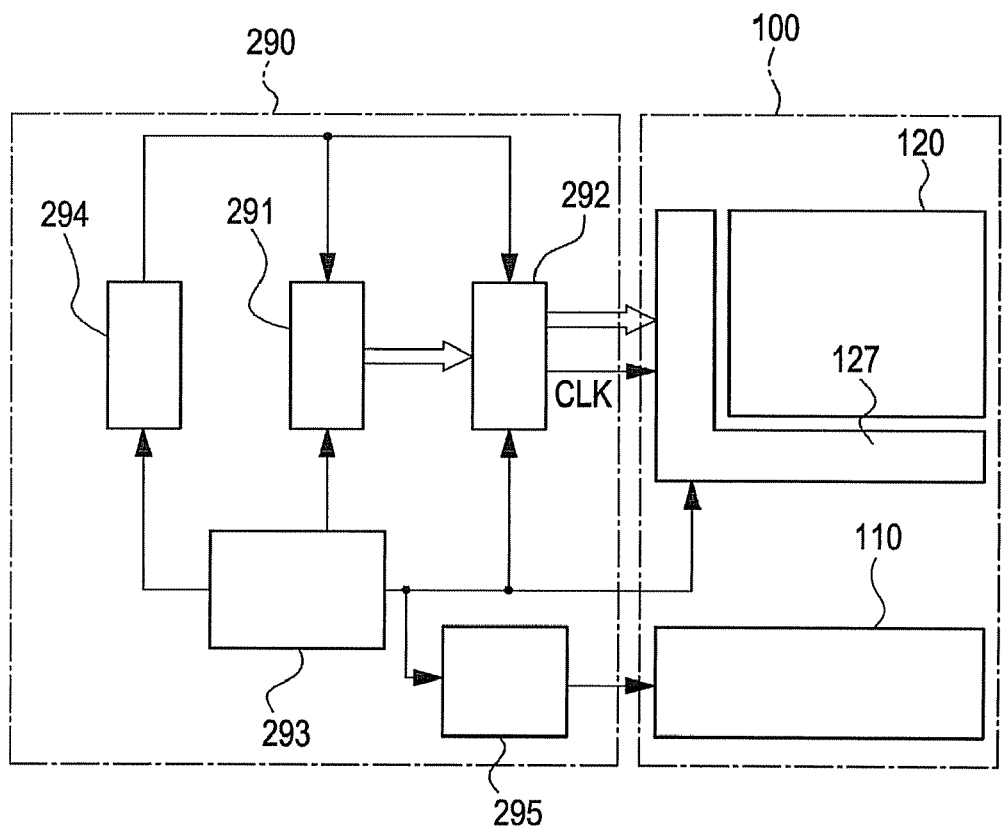
FIG. 15 is a schematic drawing showing a configuration of a display control system of the electronic equipment.

FIG. 15 is a schematic diagram showing a general configuration of a control system (display control system) with respect to the electro-optic device 100 in the electronic equipment. The electronic equipment shown here includes a display control circuit 290 having a display information output source 291, a display information processing circuit 292, a power source circuit 293, a timing generator 294 and a light source control circuit 295 for supplying power to the illuminating unit 110. The electro-optic device (liquid crystal display device) 100 is provided with the electro-optic panel 120 having the configuration as described above, a drive circuit 127 for driving the electro-optic panel 120, and the illuminating unit (illumination device) 110 as a backlight for illuminating the electro-optic panel 120. The drive circuit 127 is not limited to a mode of configured with electronic components which are directly mounted to the electro-optic panel 120. The drive circuit 127 may also be configured with a circuit pattern formed on the surface of the substrate of the electro-optic panel 120, or a semiconductor IC chip or a circuit pattern mounted on other electronic components such as a circuit substrate conductively connected to the electro-optic panel 120 or a wiring substrate 128.

The display information output source 291 is provided with a memory including a ROM (Read Only Memory) or a RAM (Random Access Memory), a storage unit including a magnetic recording disk or an optical recording disk and a tuned circuit which tunes and outputs digital image signals. The display information output source 291 is configured to supply display information to the display information processing circuit 292 in the form of image signals of a predetermined format on the basis of various clock signals generated by the timing generator 294.

The display information processing circuit 292 includes various known circuits such as a serial-parallel converting circuit, an amplifying and inverting circuit, a rotation circuit, a gamma correction circuit, a clamp circuit and so on, and executes processing on the entered display information, and supplies the image information to the drive circuit 127 together with a clock signal CLK. The drive circuit 127 includes a scanning line drive circuit, a signal line driving circuit and an inspection circuit. The power source circuit 293 supplies predetermined voltages to the respective components described above.

The light source control circuit 295 supplies an electric power to the light source of the illuminating unit 110 on the basis of the voltage supplied from the power source circuit 293, and controls the presence or absence of illumination of the light source or the luminance thereof on the basis of a predetermined control signal.

As the electronic equipment according to the invention, there are liquid crystal TV sets, car navigation apparatuses, pagers, electronic databooks, electric calculators, workstations, TV telephones, and PSO terminals in addition to the mobile phone set shown in FIG. 14. The electro-optic device (liquid crystal display device) according to the invention may be utilized as display unit of the various types of electronic equipment.

The entire disclosure of Japanese Patent Application Nos. 2007-168595, field Jun. 27, 2007 and 2008-120213, field May 2, 2008 are expressly incorporated by reference herein.

What is claimed is:

1. An electro-optic device comprising:
an electro-optic panel;
a panel supporting member for supporting the electro-optic panel from one of front side and back side of the electro-optic panel;
a mounted member to be mounted to the panel supporting member from the other one of the front side and the back side;
the electro-optic panel including at least two outer edges opposing to each other in plan view; and
the mounted member including a pair of panel positioning guides for guiding the electro-optic panel by guiding the two outer edges respectively,
wherein the two outer edges contact with the respective panel positioning guides;
side walls corresponding to the pair of panel positioning guides of the mounted member come into contact with inner walls of the panel supporting member and hence are deformed inward; and
the respective panel positioning guides are brought into contact with the two outer edges of the electro-optic panel by the deformed side walls.

2. The electro-optic device according to claim 1,
wherein one of the pair of panel positioning guides opposes one of the two outer edges,
the other one of the pair of panel positioning guides opposes the other one of the two outer edges, and
the distance between the one panel positioning guide and the other panel positioning guide is reduced from the electro-optic panel toward the other side.

3. The electro-optic device according to claim 1,
wherein a pair of side walls corresponding to the pair of panel positioning guides of the mounted member include projections directed outward,
wherein the panel supporting member includes a pair of side walls opposing the projections of the mounted member,
the pair of side walls of the panel supporting member include inner wall portions having a first distance smaller than the distance between the outer sides of the pair of projections and a second distance which is wider than the first distance from the end sides of the pair of side walls, and
the pair of projections of the mounted member are arranged on the inner wall portion of the panel supporting member having the second distance so as to oppose to each other.

4. The electro-optic device according to claim 1,
wherein a pair of side walls corresponding to the pair of panel positioning guides of the mounted member include projections directed outward,
the panel supporting member includes a pair of side walls opposing the projections of the mounted member,
the pair of side walls of the panel supporting member are set to have a smaller distance between the inner sides of the pair of side walls from the end sides of the pair of side walls than the distance of the outer sides between the pair of projections,
the pair of side walls of the panel supporting member include opening at positions opposing the projections of the mounted member, and
the pair of projections of the mounted member engage the opening of the panel supporting member.

5. The electro-optic device according to claim 1,
wherein the pair of panel positioning guides and the two outer edges include members interposed therebetween, respectively.

6. The electro-optic device according to claim 1,
wherein the panel supporting member and the electro-optic panel are adhered via adhesive layers, and the adhesive layers have an adhesive force which allows the electro-optic device to be moved by the pair of panel positioning guides.

7. The electro-optic device according to claim 1,
wherein at least two pairs of panel positioning guides opposing along the different directions from each other are provided.

8. Electronic equipment comprising the electro-optic device according to claim 1 and a control unit for the electro-optic device.

* * * * *